US008321667B2

(12) United States Patent
Bradshaw et al.

(10) Patent No.: US 8,321,667 B2
(45) Date of Patent: Nov. 27, 2012

(54) SECURITY MODEL FOR COMMON MULTIPLEXED TRANSACTIONAL LOGS

(75) Inventors: Dexter P. Bradshaw, Duvall, WA (US);
William R. Tipton, Seattle, WA (US);
Dana Groff, Sammamish, WA (US);
Zoheb Lester Alexander Vacheri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1006 days.

(21) Appl. No.: 11/711,990

(22) Filed: Feb. 28, 2007

(65) Prior Publication Data

US 2008/0208924 A1    Aug. 28, 2008

(51) Int. Cl.
*H04L 29/06* (2006.01)
*G06F 17/00* (2006.01)

(52) U.S. Cl. ........ 713/165; 707/703; 707/826; 713/193; 713/153; 726/5; 726/22

(58) Field of Classification Search .................. 713/165; 707/703, 826
See application file for complete search history.

(56) References Cited

U.S. PATENT DOCUMENTS

| | | | |
|---|---|---|---|
| 5,557,773 A * | 9/1996 | Wang et al. .......................... 1/1 |
| 5,918,228 A * | 6/1999 | Rich et al. ........................... 1/1 |
| 6,070,174 A * | 5/2000 | Starek et al. ......................... 1/1 |
| 6,185,615 B1 | 2/2001 | Labiaga et al. |
| 6,247,149 B1 | 6/2001 | Falls et al. |
| 6,405,317 B1 | 6/2002 | Flenley et al. |
| 6,453,383 B1 * | 9/2002 | Stoddard et al. .............. 711/112 |
| 6,996,580 B2 | 2/2006 | Bae et al. |
| 7,039,948 B2 | 5/2006 | Harrah et al. |
| 7,120,800 B2 * | 10/2006 | Ginter et al. ................... 713/193 |
| 7,143,288 B2 * | 11/2006 | Pham et al. ..................... 713/165 |
| 7,334,124 B2 * | 2/2008 | Pham et al. ..................... 713/162 |
| 7,395,049 B2 * | 7/2008 | Piikivi .............................. 455/410 |
| 7,395,436 B1 * | 7/2008 | Nemovicher ................... 713/193 |
| 7,502,796 B2 * | 3/2009 | Parkkinen et al. .................... 1/1 |
| 7,512,979 B1 * | 3/2009 | Koike et al. ........................ 726/23 |

(Continued)

FOREIGN PATENT DOCUMENTS

EP    1168138 A3    1/2002

OTHER PUBLICATIONS

Kevin Greenan, Reliability Mechanisms for File Systesm, Oct. 25, 2006, IEEE / ACM, Aug. 6, 2010, pp. 179-184.*

(Continued)

*Primary Examiner* — Nathan Flynn
*Assistant Examiner* — Viral Lakhia
(74) *Attorney, Agent, or Firm* — Mayer & Williams, PC (57) ABSTRACT

A security model is provided in a transactional logging infrastructure that is arranged as a protected subsystem built on an underlying secure file system. Files in the underlying file system used by virtual log streams are protected from direct user writes, and are written-to only through the protected subsystem that is brokered by a machine-wide principal so that virtual log files sharing the same multiplexed physical log are kept secure from each other. Log file handles and user- and kernel-mode objects are exposed to log clients through interfaces using consistent security semantics for both dedicated and virtual logs. Log clients are agnostic of the underlying secure file system and can only manipulate file system containers—abstract objects that implement the physical log and used to virtualize the file system by normalizing input/output operations—by using the interfaces brokered by the principal in the protected subsystem.

11 Claims, 6 Drawing Sheets

U.S. PATENT DOCUMENTS

| | | | |
|---|---|---|---|
| 7,549,083 B2* | 6/2009 | Eguchi et al. | 714/15 |
| 7,552,467 B2* | 6/2009 | Lindsay | 726/5 |
| 8,099,758 B2* | 1/2012 | Schaefer et al. | 726/1 |
| 2002/0138762 A1 | 9/2002 | Horne | |
| 2003/0051070 A1* | 3/2003 | Shappir et al. | 709/328 |
| 2003/0055809 A1 | 3/2003 | Bhat | |
| 2003/0115476 A1* | 6/2003 | McKee | 713/193 |
| 2003/0212899 A1 | 11/2003 | Curtis | |
| 2003/0226058 A1* | 12/2003 | Miller et al. | 714/15 |
| 2004/0221163 A1* | 11/2004 | Jorgensen et al. | 713/182 |
| 2005/0091518 A1 | 4/2005 | Agarwal et al. | |
| 2005/0144422 A1* | 6/2005 | McAlpine et al. | 711/206 |
| 2005/0216466 A1* | 9/2005 | Miyamoto et al. | 707/9 |
| 2006/0020616 A1* | 1/2006 | Hardy et al. | 707/101 |
| 2006/0036660 A1* | 2/2006 | Lynn | 707/204 |
| 2006/0137019 A1 | 6/2006 | Dettinger et al. | |
| 2007/0027929 A1* | 2/2007 | Whelan | 707/200 |
| 2007/0050620 A1* | 3/2007 | Pham et al. | 713/165 |
| 2007/0143827 A1* | 6/2007 | Nicodemus et al. | 726/2 |
| 2007/0208743 A1* | 9/2007 | Sainaney | 707/9 |
| 2008/0133615 A1* | 6/2008 | Bradshaw et al. | 707/202 |
| 2008/0155690 A1* | 6/2008 | Broshy et al. | 726/22 |

OTHER PUBLICATIONS

"Module mod_log_config", http://httpd.apache.org/docs/1.3/mod/mod_log_config.html.

Adamski, et al., Documented first release of the security infrastructure and APIs, pp. 1-22.

Maston, Michael, "Managing Windows with WMI", http://msdn.microsoft.com/library/default.asp?url=/library/en-us/dnwmi/html/mngwmi.asp.

* cited by examiner

SECURITY MODEL FOR COMMON MULTIPLEXED TRANSACTIONAL LOGS

BACKGROUND

Transactional logging involves maintaining a transactional log that durably records a time serial history of transactions in a system. The transactional log provides information for restoring a system to a particular state in time prior to a system failure. A transactional logging system must be able to reliably and accurately restore logging functionalities after such a system failure. In some transactional logging systems, log files are arranged as either real (i.e., dedicated logs) or virtual (i.e., multiplexed) logs that are presented as opaque file handles or file objects that are exposed to user- and kernel-mode clients.

It would be desirable to be able to preserve log file semantics, including security semantics, between real and dedicated log files. An objective is that log client application logic should be agnostic as to whether its underlying log is running in a dedicated or multiplexed mode. That is, implementing an application with either a dedicated log client or multiplexed log client should have no impact on the application logic. A particular virtual log would therefore need to be secured against access by a user of any other virtual log stream, unless such a user is granted explicit access, because all virtual log streams share the same physical multiplexed log. Such security is desirable in order to prevent a pathological log client with a malicious intent from inappropriately accessing another log stream or data from containers used in the file system which underlies the multiplexed log. Accidental or inadvertent access to another log client's virtual stream and/or data is also preventable with such security.

This Background is provided to introduce a brief context for the Summary and Detailed Description that follows. This Background is not intended to be an aid in determining the scope of the claimed subject matter nor be viewed as limiting the claimed subject matter to only those implementations that may solve any or all of the disadvantages or problems presented above.

SUMMARY

A security model is provided in a transactional logging infrastructure that is arranged as a protected subsystem built on an underlying secure file system. Files in the underlying file system used by virtual log streams are protected from direct user writes, and are written to only through the protected subsystem that is brokered by a machine-wide principal (e.g., a local system-principal or a common log file system-principal called a "CLFS-principal") so that virtual log files sharing the same multiplexed physical log are kept secure from each other. Log file handles and user- and kernel-mode objects are exposed to log clients through interfaces using consistent security semantics for both dedicated and virtual logs. Log clients are agnostic of the underlying secure file system and can only manipulate file system containers—abstract objects that implement the physical log and used to virtualize the file system by normalizing I/O (input/output) operations—by utilizing the interfaces to the protected subsystem. The principal manipulates container handles to responsively direct the I/O from the log clients to the underlying file system.

In an illustrative example, a creator of a log file (real and/or virtual), is the owner of the log file, is provided access to the log file and its associated metadata, and may add log streams to the log file. The owner is further enabled with the ability to grant permissions to others to access the log file and/or add log streams. However, such log file access is kept separate and distinct, under the present security model, from access to containers in the underlying file system. Container security is separately implemented from log file security in the protected subsystem. The machine-wide principals, such as the CLFS-principal or local system-principal, are the only components in the present security model which are given the responsibility to write to containers in the underlying file system and update discretionary access to containers.

In other illustrative examples, a set of assertions (i.e., rules) is defined to govern log file security, and another set governs container file security. Security descriptors, or alternatively cryptographically-secure signatures, which encode access control to the log files and file system containers are atomically validated and updated across multiple file system containers. In addition, because log files cannot be copied or moved without going through the protected subsystem, a log file import/export functionality is provided.

The present security model for common multiplexed transactional logs advantageously provides for the same high level of security for multiplexed virtual logs that is enabled for dedicated logs, while maintaining security semantics and application logic irrespective of whether a real or virtual log is utilized. By separating log file from file system access, the protected subsystem enables log file security while preventing inadvertent or malicious access to a log through the file system.

This Summary is provided to introduce a selection of concepts in a simplified form that are further described below in the Detailed Description. The benefits and advantages noted in this Summary are not intended to limit the claimed subject matter to only those implementations that contain those benefits or advantages. In addition, this Summary is not intended to identify key features or essential features of the claimed subject matter, nor is it intended to be used as an aid in determining the scope of the claimed subject matter.

DETAILED DESCRIPTION

Transactional systems include database management systems, messaging systems such as store-and-forward systems, transaction managers, transaction files systems, and online transactional processing systems. A single logical operation on data in such systems is called a transaction. Key transactional processing properties are commonly identified by the acronym "ACID" which stands for Atomicity, Consistency, Isolation, and Durability. Conforming with ACID properties generally ensures that transactions are processed reliably and durably.

One method for implementing the ACID properties involves the use of a transactional log. A transactional log may comply with the popular ARIES (Algorithms for Recovery and Isolation Exploiting Semantics) in which case it is called an "ARIES log." Typically, ARIES implements write ahead logging (WAL) where any change to an object is first recorded in the log, and the log is written to stable storage (e.g., a disk) before the changes to the object are implemented. Thus changes to the object and transactions in general are capable of being rolled back or undone. Thus ARIES logs are commonly utilized in system recovery and restoration situations so that transactional systems may be brought back to the state in which they were operating before a system failure.

Figure 1:
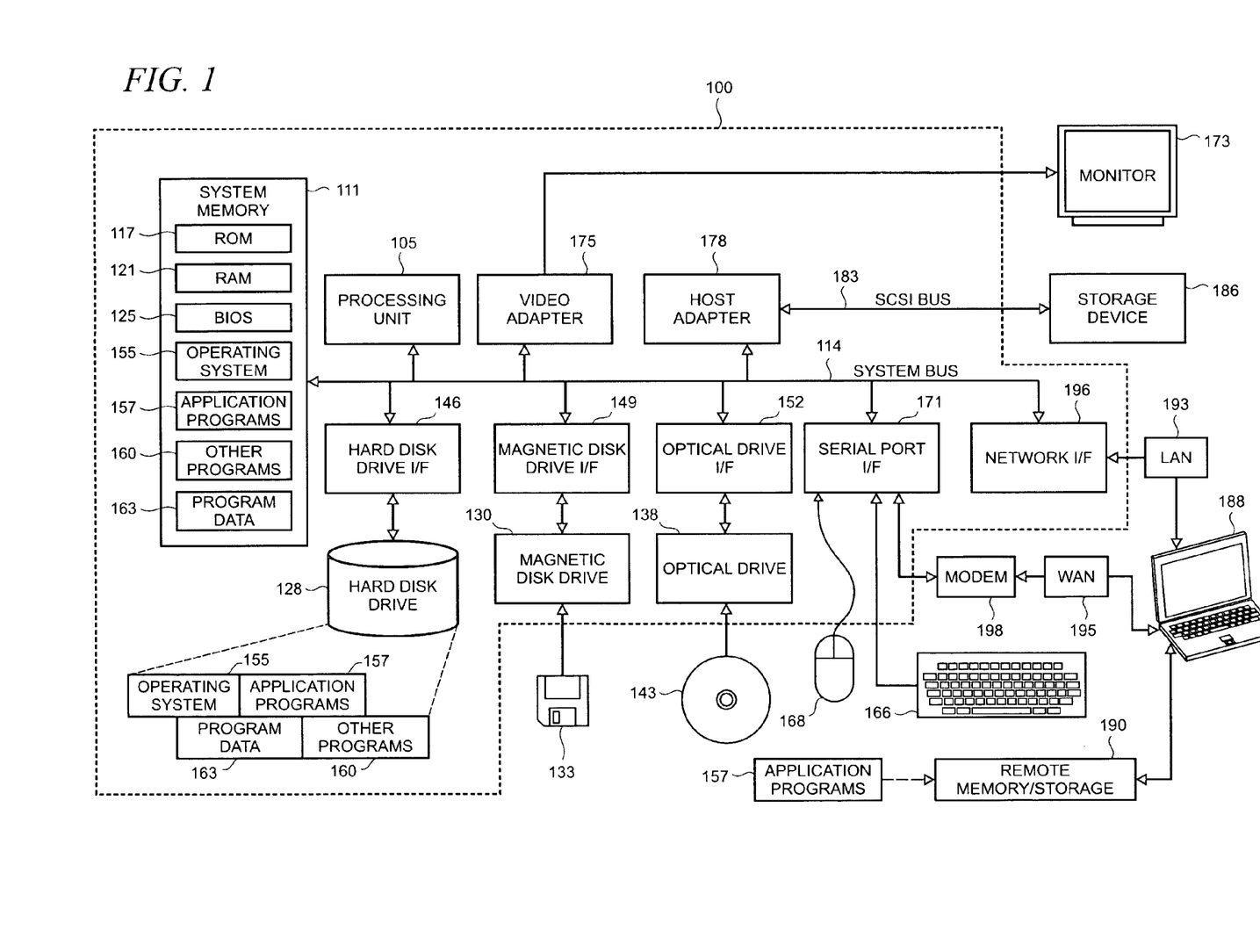
FIG. 1 is a simplified block diagram of an illustrative computer system in which the present security model for common multiplexed transactional logging may be implemented.

Turning now to the drawings in which like reference numerals indicate like elements, FIG. 1 is a simplified block diagram of an illustrative computer system 100 such as a personal computer ("PC") or server with which the present security model for common multiplexed transactional logs may be implemented. Computer system 100 includes a processing unit 105, a system memory 111, and a system bus 114 that couples various system components including the system memory 111 to the processing unit 105. The system bus 114 may be any of several types of bus structures including a memory bus or memory controller, a peripheral bus, or a local bus using any of a variety of bus architectures. The system memory 111 includes read only memory ("ROM") 117 and random access memory ("RAM") 121. A basic input/output system ("BIOS") 125, containing the basic routines that help to transfer information between elements within the computer system 100, such as during start up, is stored in ROM 117. The computer system 100 may further include a hard disk drive 128 for reading from and writing to an internally disposed hard disk (not shown), a magnetic disk drive 130 for reading from or writing to a removable magnetic disk 133 (e.g., a floppy disk), and an optical disk drive 138 for reading from or writing to a removable optical disk 143 such as a CD (compact disc), DVD (digital versatile disc) or other optical media. The hard disk drive 128, magnetic disk drive 130, and optical disk drive 138 are connected to the system bus 114 by a hard disk drive interface 146, a magnetic disk drive interface 149, and an optical drive interface 152, respectively. The drives and their associated computer readable media provide non-volatile storage of computer readable instructions, data structures, program modules and other data for the computer system 100. Although this illustrative example shows a hard disk, a removable magnetic disk 133 and a removable optical disk 143, other types of computer readable media which can store data that is accessible by a computer such as magnetic cassettes, flash memory cards, digital video disks, data cartridges, random access memories ("RAMs"), read only memories ("ROMs") and the like may also be used in some applications of the present dynamic database memory management. In addition, as used herein, the term computer readable medium includes one or more instances of a media type (e.g., one or more magnetic disks, one or more CDs, etc.).

A number of program modules may be stored on the hard disk, magnetic disk 133, optical disc 143, ROM 117 or RAM 121, including an operating system 155, one or more application programs 157, other program modules 160 and program data 163. A user may enter commands and information into the computer system 100 through input devices such as a keyboard 166 and pointing device 168 such as a mouse. Other input devices (not shown) may include a microphone, joystick, game pad, satellite disk, scanner or the like. These and other input devices are often connected to the processing unit 105 through a serial port interface 171 that is coupled to the system bus 114, but may be connected by other interfaces, such as a parallel port, game port or universal serial bus ("USB"). A monitor 173 or other type of display device is also connected to the system bus 114 via an interface, such as a video adapter 175. In addition to the monitor 173, personal computers typically include other peripheral output devices (not shown), such as speakers and printers. The illustrative example shown in FIG. 1 also includes a host adapter 178, a Small Computer System Interface ("SCSI") bus 183, and an external storage device 186 connected to the SCSI bus 183.

The computer system 100 is operable in a networked environment using logical connections to one or more remote computers, such as a remote computer 188. The remote computer 188 may be selected as another personal computer, a server, a router, a network PC, a peer device or other common network node, and typically includes many or all of the elements described above relative to the computer system 100, although only a single representative remote memory/storage device 190 is shown in FIG. 1. The logical connections depicted in FIG. 1 include a local area network ("LAN") 193 and a wide area network ("WAN") 195. Such networking environments are often deployed, for example, in offices, enterprise-wide computer networks, intranets and the Internet.

When used in a LAN networking environment, the computer 100 is connected to the local area network 193 through a network interface or adapter 196. When used in a WAN networking environment, the computer system 100 typically includes a broadband modem 198, network gateway or other means for establishing communications over the wide area network 195, such as the Internet. The broadband modem 198, which may be internal or external, is connected to the system bus 114 via the serial port interface 171. In a networked environment, program modules related to the computer system 100, or portions thereof, may be stored in the remote memory storage device 190. It is noted that the network connections shown in FIG. 1 are illustrative and other means of establishing a communications link between the computers may be used depending on the specific requirements of an application of database memory management.

Figure 2:
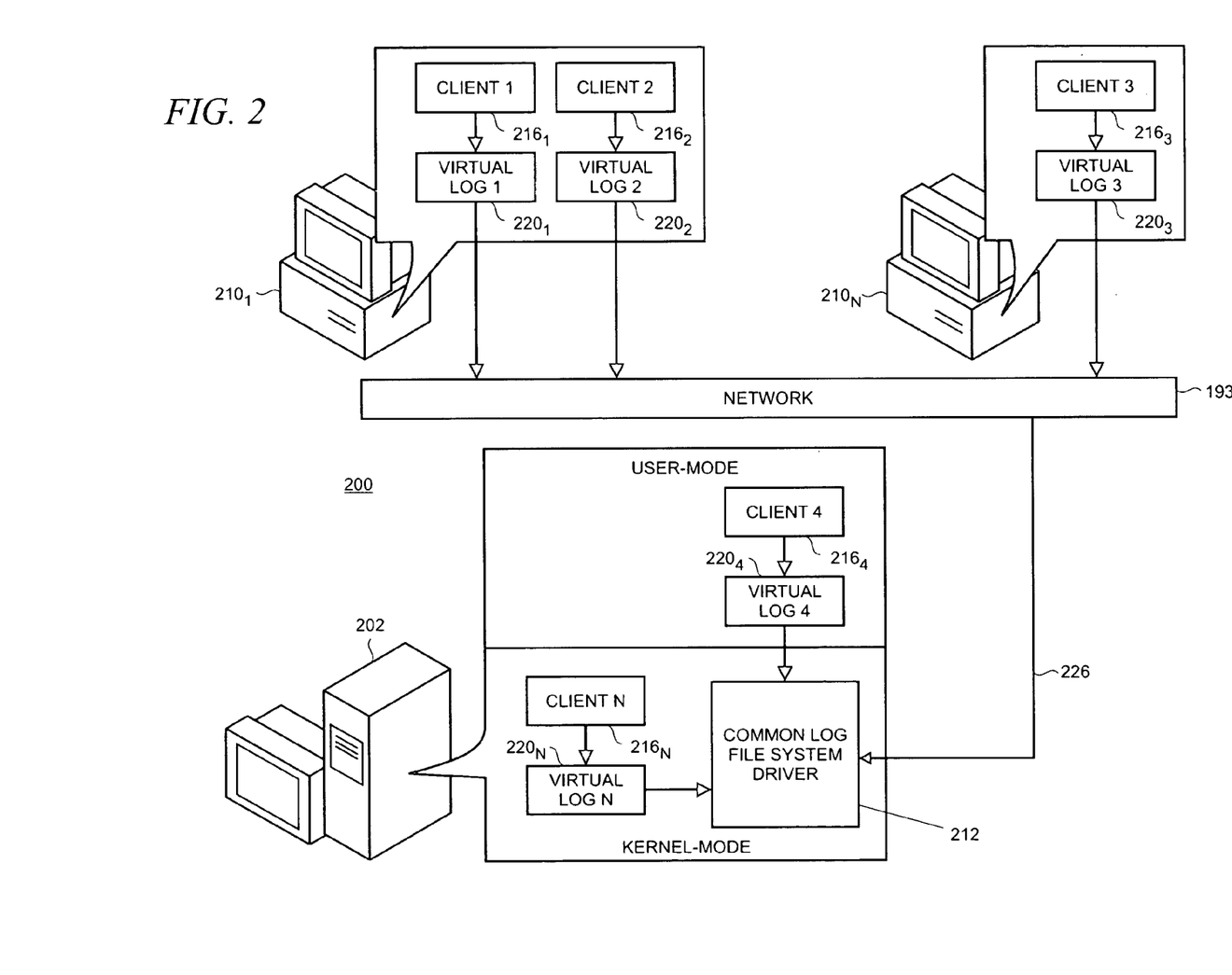
FIG. 2 is a pictorial view of an illustrative network environment in which the present security model for common multiplexed transactional logs may be implemented.

FIG. 2 is a pictorial view of an illustrative network environment 200 in which the present security model for common multiplexed transactional logs may be implemented. The illustrative network environment 200 shows a typical client-server type architecture that is used to implement one or more transactional systems. Such transactional systems typically include databases, transactions processing systems, and messaging systems. Event logging systems including event management systems that implement, for example, network event logging, threat analysis logging, and audit logging are also contemplated as being usable in some applications of the present security model. In alternative arrangements, the network environment 200 is configurable to support peer-to-peer type architectures.

A server 202 communicates with a plurality of client computers $210_1 \ldots 210_N$ over a network (e.g., local area network 193 as shown in FIG. 1). Note, however, that remote logging by the client computers $210_{1-N}$ is an optionally utilized functionality as the present security model is applicable to either local or remote logging, or combinations thereof. In this illustrative example, the server 202 and clients 210 are each implemented using a computer system that is arranged with similar features and functionalities as computer system 100 shown in FIG. 1 and described in the accompanying text.

More specifically, server 202 is arranged to host an operating system that includes a kernel-mode driver which, in this illustrative example, is called a common log file system ("CLFS") driver 212.

CLFS driver 212 is a component that, in combination with kernel-mode and user-mode APIs (application programming interfaces) as described below, provides logging services to a number of log clients in the network environment 200. In this illustrative example, the provided logging services are ARIES-compliant. However, the CLFS driver 212 and associated APIs are not limited to supporting ARIES and may be used in a variety of logging scenarios.

Log clients 1, 2, 3 and N are indicated by reference numerals $216_{1-N}$ in FIG. 2. Log clients 216 may include applications, drivers, threads, or other units of software that use a transactional log.

Each log client $216_{1-N}$ is shown in FIG. 2 as having an associated virtual log $220_{1-N}$. The logs 220 are virtual in the sense that each log client 216 is provided with a log that appears and functions as a client's own dedicated log even though only a single, common physical log is managed by CLFS driver 212. In this illustrative example, the physical log contains multiplexed log records from the plurality of log clients 216. In most applications, such multiplexing provides an effective method for providing robust logging services on a memory-efficient basis and is thus generally preferred. Although this illustrative example uses a multiplexed physical log file, the choice of usage of dedicated or multiplexed logs will typically be made according to the requirements of a specific application of transactional logging.

As shown in FIG. 2, virtual logs 1, 2, and 3 (indicated by reference numerals $220_{1-3}$) are coupled to the CLFS driver 212 at the kernel-mode level through network connection 226. In addition, the Nth client, $216_N$, is commonly disposed in server 202, and is coupled to the CLFS driver 212 in kernel-mode. The 4th client $216_4$ is also commonly disposed in server 202, and is coupled to the CLFS driver 212 in user-mode. Accordingly, log clients $216_{1-3,N}$ are considered kernel-mode log clients and log client $216_4$ is considered a user-mode client.

Figure 3:
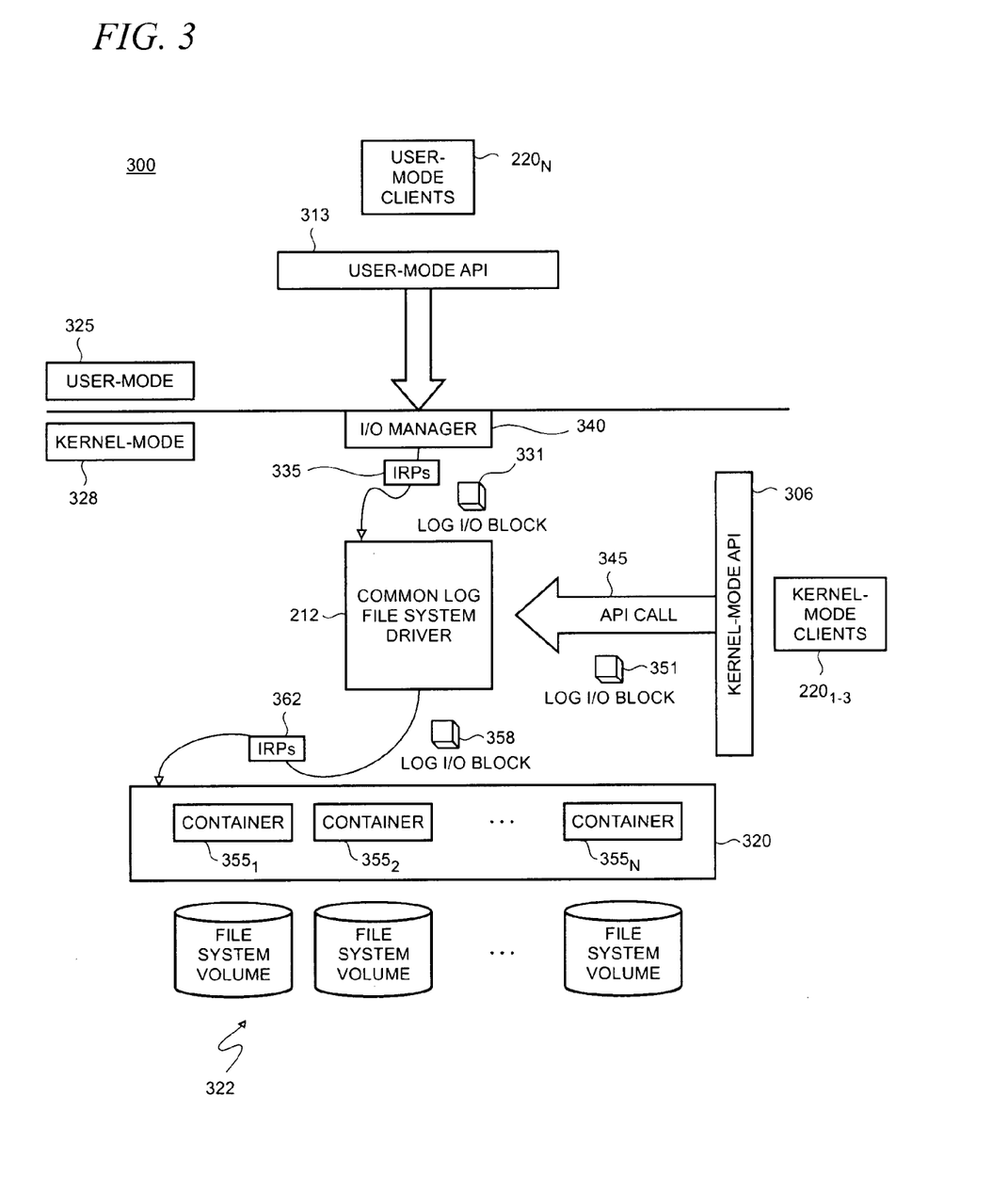
FIG. 3 is a block diagram of an illustrative common log file system architecture.

FIG. 3 is a block diagram of an illustrative common log file system architecture 300 comprising the CLFS driver 212, a kernel-mode API 306, a user-mode API 313, a physical log 320, and stable storage formed by a group of file system volumes 322. In this illustrative example, physical log 320 is a physical set of files and attributes that store one or many log streams. A log stream is a sequence of log records that a client logs. A log record is the basic unit of data that a log client can append to or read from a log.

CLFS architecture 300 functions to marshal log records generated by the log clients into virtual logs 220 (FIG. 2) and then reliably read them back. Log records in the virtual logs 220 are sequenced into log streams and written to stable storage in the form of log I/O blocks (which are buffers for the log records). The log clients 216 (FIG. 2) are thus enabled with the ability to accurately repeat history after recovery from a system failure or system restart. In addition, CLFS architecture 300 enables user-mode and kernel-mode clients to create/open log files, expand and shrink them, delete them, and marshal log records to and from client-defined buffers in a marshalling area. The marshalling area is an abstraction provided by APIs 306 and 313 to respective kernel-mode log clients and user-mode log clients.

Architecture 300 is divided into user-mode 325 and kernel-mode 328. Kernel-mode is the processor access mode in which operating system components and drivers run. Kernel-mode processes can directly access system data and hardware, and are not restricted as are user-mode processes. Performance-sensitive drivers and services run in kernel mode to interact with hardware more efficiently. All kernel-mode components are fully protected from applications running in user mode.

User-mode is the processor access mode in which applications and subsystems run on the computer system (e.g., computer system 100 in FIG. 1) in user mode. Processes that run in user mode do so within their own virtual address space. They are restricted from gaining direct access to many parts of the system, including system hardware, memory not allocated for user-mode, and other portions of the system that might compromise system integrity.

CLFS architecture 300 is arranged to cleanly separate the marshalling function from the physical I/O to disk. This is accomplished by maintaining a separate marshalling area for each log client with its own address space. Marshaled log I/O blocks for each of the client's log files are queued for stable storage through a single, shared and centrally managed log flush queue (not shown). APIs 306 and 313 control the respective marshalling of log records into log I/O blocks and the migration of log I/O blocks to and from the log flush queue for kernel-mode and user-mode log clients.

In user-mode, the user-mode API 313 passes references to log I/O blocks (shown as a single representative log I/O block 331 in FIG. 3) to the log flush queue managed by CLFS driver 212 using I/O request packets 335 ("IRPs") on a log file handle to an I/O manager 340. CLFS driver 212 provides handlers for each type of I/O request and schedules the log I/O block on the log flush queue for writing to the physical log in the proper order across all the virtual logs 220. Kernel-mode operations are arranged, in this illustrative example, to bypass the I/O manager 340 and manipulate log file objects directly through the kernel-mode API 306 using an API call 345. Accordingly log I/O blocks (shown as a single representative log I/O block 351 in FIG. 3) from kernel-mode log clients are scheduled on the log flush queue.

An abstract object called a container is used to present an underlying file system, such as the NTFS file system in the Windows operating system, to the CLFS architecture 300 and log clients 216 to thereby normalize all I/O operations. Containers $355_{1-N}$ are utilized to form the logical sequential physical log. The file system may utilize one or more file system volumes 322 (that are physically implemented on one or more hard disk drives 128 in FIG. 1). Containers 355 are used to embody the physical log utilized in the present security model as a logical single contiguous physical log 320. Use of the container abstraction advantageously enables any local or remote file system conforming with the Windows NT operating system I/O model to interoperate as the underlying file system supporting the CLFS architecture 300. Such interoperability reduces the need to embed volume management functionality in the CLFS driver 212 and streamlines the APIs 306 and 313.

CLFS driver 212 writes log I/O blocks (shown as a single representative log I/O block 358) into containers 355 using IRPs 362. The physical log 320 generally will comprise multiple discrete containers 355 and the CLFS driver 212 strings multiple containers together logically to form a single, logical, sequential disk extent to give the log clients 216 a logical view of a single contiguous physical log stream.

For a given physical log, all containers 355 have the same size. A single container 355 provides a unit of growth or shrinkage of a physical log according to the log streams feeding it. Initially, at least two containers must be allocated to each log, but a log client 216 can dynamically grow or shrink a physical log by respectively adding containers to or deleting them from the physical log. Resizing the physical log involves minimal synchronization and performance overhead.

Figure 4:
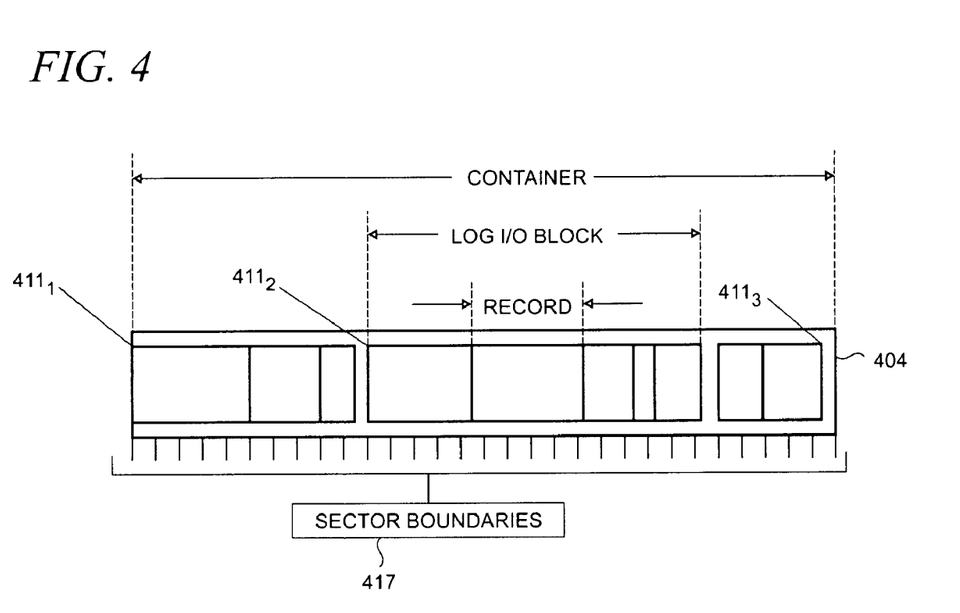
FIG. 4 is a block diagram showing details of an illustrative container structure for storing log records on a stable storage medium such as a disk.

FIG. 4 is a block diagram showing details of an illustrative container structure 404 for storing log records on a stable storage medium such as a disk. In this illustrative example, container 404 holds three log I/O blocks $411_{1-3}$. Log I/O block $411_1$ contains three variably-sized log records. Log I/O block $411_2$ contains five variably-sized log records. Log I/O block $411_3$ contains two variably-sized log records. As shown in FIG. 4, the beginning of each log I/O block 411 is always aligned with the beginning of a sector boundary 417 on the stable storage medium.

Figure 5:
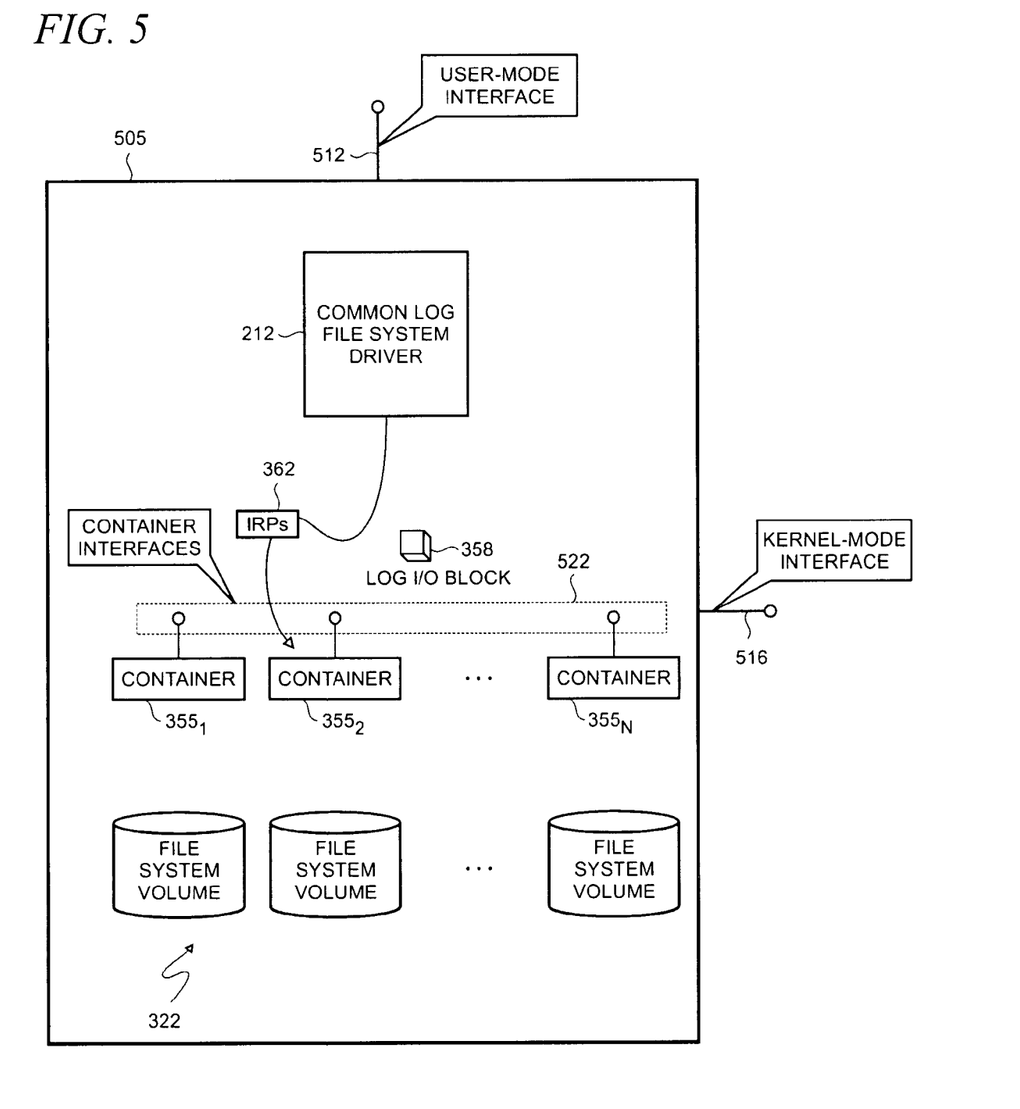
FIG. 5 is a simplified block diagram of an illustrative architecture for a protected subsystem.

FIG. 5 is a simplified block diagram of an illustrative architecture which arranges components of the common log file system 300 (FIG. 3) as a protected subsystem 505. The protected subsystem 505 takes advantage of the manner in which the common log file system 300 is implemented where log clients operate on both real and virtual log files via opaque handles in user mode and file objects in kernel mode. In addition, a container object virtualizes the underlying file system. In particular, container objects are the only components which create/open and submit I/O operations to the underlying container files. Accordingly, log clients own and manipulate log files, but the containers themselves are the property of the file system.

Protected subsystem 505 exports both a user-mode interface 512 and a kernel-mode interface 516 to log clients. Operations on these interfaces are determined by permissions applied to the log client at the time it obtains the interface. The log client is arranged to be agnostic with regards to the underlying file system 322, and is not provided with any means for manipulating the containers 355. The CLFS driver 212 intercepts all I/O requests from the log clients on the interfaces 512 and 516 and directs the I/O appropriately to the underlying file system 322. Containers 355 are opened and manipulated only through operations on the container object interfaces indicated collectively by reference numeral 522.

Within the protected subsystem 505, the CLFS driver 212 manipulates two types of file objects: log file objects used for real and virtual logs, and container file objects. The security of the log file depends on the specification of security on these two types of file objects in relationship to the log client.

User-and kernel-mode log clients create log files using APIs named CreateLogFile and ClfsCreateLogFile, respectively. The same APIs create both real and virtual log files in both user-and kernel-mode, and the log file named parameter is used to distinguish between the creation of a real and a virtual log file. Here, a log file name consists of a real log file name and an optional virtual stream name that is unique to the real log file as shown below:

log:<real log name>[::[virtual stream name>]]

A dedicated log file is created simply by specifying the real log file name component without the "::" delimiter and the virtual stream name. Specifying "log:<real log name>::" creates a multiplexed log without any virtual streams. Virtual logs may be added later by log clients with FILE_ADD_FILE permissions on the real log. This option is motivated by scenarios where log clients want to perform administrative functions on the log file only, and not necessarily write data to the log. In cases in which a real log file administrator also wants to write to virtual log streams in a multiplexed log, a full log name including an initial default virtual log stream can be specified. In this case the administrator automatically has FILE_ADD_FILE access to the real log file. Other log clients wishing to add virtual streams must acquire these rights explicitly.

The creator of a log file, both real and virtual, is the owner of the log file and has full I/O access to the log file, its metadata, and discretionary access control. However, such ownership does not mean that the creator of the log file has full access to its underlying containers. The creation APIs noted above are arranged with a security attributes parameter with which log creators explicitly may allow or deny discretionary access control to other log clients. After creation, log file owners can add, delete, or modify discretionary access control with the APIs named GetSecurityInfo and SetSecurityInfo.

The present security model employs the following set of assertions, or rules, that are applied to log file objects:

1. The creator of a log file, real or virtual, is sole owner of the log file with the exceptions of Assertion (2) below. All other users must be granted specific access to operate on a log file.
    2. The only exceptions to Assertion (1) follow:
        a. A machine-wide principal (e.g., either a CLFS- or system-principal) is an owner of every log file.
        b. Any principal in the administrative group (i.e., those that may have special privileges) is an owner of the log file.
        c. The creator of a real multiplexed log file owns the physical log file and also is an owner of all virtual log files in the real log file.
        d. Principals or groups with backup privileges can read the metadata of any log file.
        e. Principals or groups with restore privileges have full access to any log file.
    3. Arbitrary log clients needing to create virtual log files in a real log file need child creation permissions on the real log file.
    4. The default security for a real log file is inherited from the underlying file system.
    5. The default security for a virtual log file is inherited from its underlying real log file.
    6. Null security on a log file gives full access to all log clients accessing the log file.
    7. No part of the metadata or the client data of a secure log can be stored on a non-secure file system.
    8. A log with null security can be created on any file system—both secure and non-secure.

Assertion (1) gives the creator of either a real or virtual log full access to the log data. The creator of the log has the ability to grant or deny any permissions whatsoever on the log to any other principal on the system.

Assertion (2) specifies the set of principals that may override the rule specified in Assertion (1). The set includes the system principal, any administrator, and principals with backup/restore privileges. Assertion (2) also specifies that the owner of a physical log has full access to any stream. This logically follows, since whoever controls the physical log has full access to the log data and metadata at any time. Virtual log clients will therefore always have to trust the principal or log client that owns the underlying physical log, but need not trust any peer owners on other virtual log streams.

Assertion (3) says that any arbitrary log client lying outside the ownership set implied by Assertions (1) and (2) must be granted child creation permissions on the underlying real log file to create a virtual log within it. These permissions are established when the real log file is created or can be granted by modifying the real log file security permissions. Note, because of this assertion, none of the principals belonging to the ownership set need to have initial child creation access to the real log file but may grant this permission themselves if necessary.

Assertion (4) defines the default security on a real log file as the union of Assertion (1) and the permissions inherited from the underlying file system). Inherited permissions are determined by the permissions on the file containing the log metadata (called a "base log file" ("BLF") as described below in the text accompanying FIG. 6). Assertion (5) specifies that the default security on a virtual log file is the union of Assertion (1) and the permissions inherited from the underlying physical log. Note that in both cases, ownership permissions for a log file are attached to a log client creating the log file via an access control list even though the default security is inherited.

Assertions (6) through (8) specify the meaning of and conditions for null security on a log file. Note that null security (where all log clients are explicitly granted access rights to a log file) is distinguished from default security where no security is specified. Assertion (6) intuitively conveys the notion of null security on most file systems while Assertions (7) and (8) specify a necessary condition for secure log files. More specifically, a corollary of Assertions (7) and (8) is that a log file is secure if and only if all components of its containers and its metadata are stored on a secure file system. Otherwise, either the log file does not exist, or it has null security.

The present protected subsystem, as noted above, is restrictive with access to container file objects and exclusively delegates container access to the machine-wide principal (e.g., either a CLFS-principal or a local system-principal). Accordingly, the present security model also employs the following set of assertions, or rules, that are applied to container file objects:
  A. Containers are created or opened, and owned by a machine-wide principal (e.g., a CLFS-principal, or a local system-principal). The machine-wide principals are the only ones with read/write and control access to the containers.
  B. Principals in an administrative group will initially have ownership but no permissions delete the container or, to read from or write data to a container.
  C. The principal that owns the real log file initially has no ownership permission on containers unless they qualify with Assertions (A) and (B) or are given the necessary permissions by an administrator. However, on creation of the log, it has permission to read and delete containers.
  D. Regardless of whether or not security is specified on the real log file (either by default or through specification of null security), Assertions (A), (B), and (C) will always hold for containers created on a secure file system.
  E. Containers have the usual file system semantics for principals with backup and restore privileges.

Assertion (A) is the basis for implementing a protected subsystem. This assertion specifies that containers are opened by the protected subsystem under the context of a broker (i.e., the machine-wide principal) on behalf of the client. In one illustrative example, the CLFS driver 212 (FIG. 5) is responsible for maintaining and managing log file containers. Assertion (C) qualifies Assertion (B) as it defines special read and delete privileges on containers for owners of a real log file to which the container belongs (even though the real log file owner has no ownership on the containers themselves).

Assertion (B) specifies that any administrator has ownership rights over a log file container but no permissions delete the container or access data within the container. In order to perform these operations an administrator must explicitly give itself these permissions.

Assertion (D) specifies that no container on a secure file system ever has null or default security and Assertions (A), (B), and (C) will always apply and the protected subsystem remains intact.

Assertion (E) specifies that containers can always be backed up and restored by principals that have the appropriate backup and restore privileges, respectively. Such privileges do not necessarily imply other rights or privileges are given, however. Principals with backup privileges accordingly have read access to both the container metadata and its data and a principal with restore privileges has read/write access to both the container data and metadata.

Figure 6:
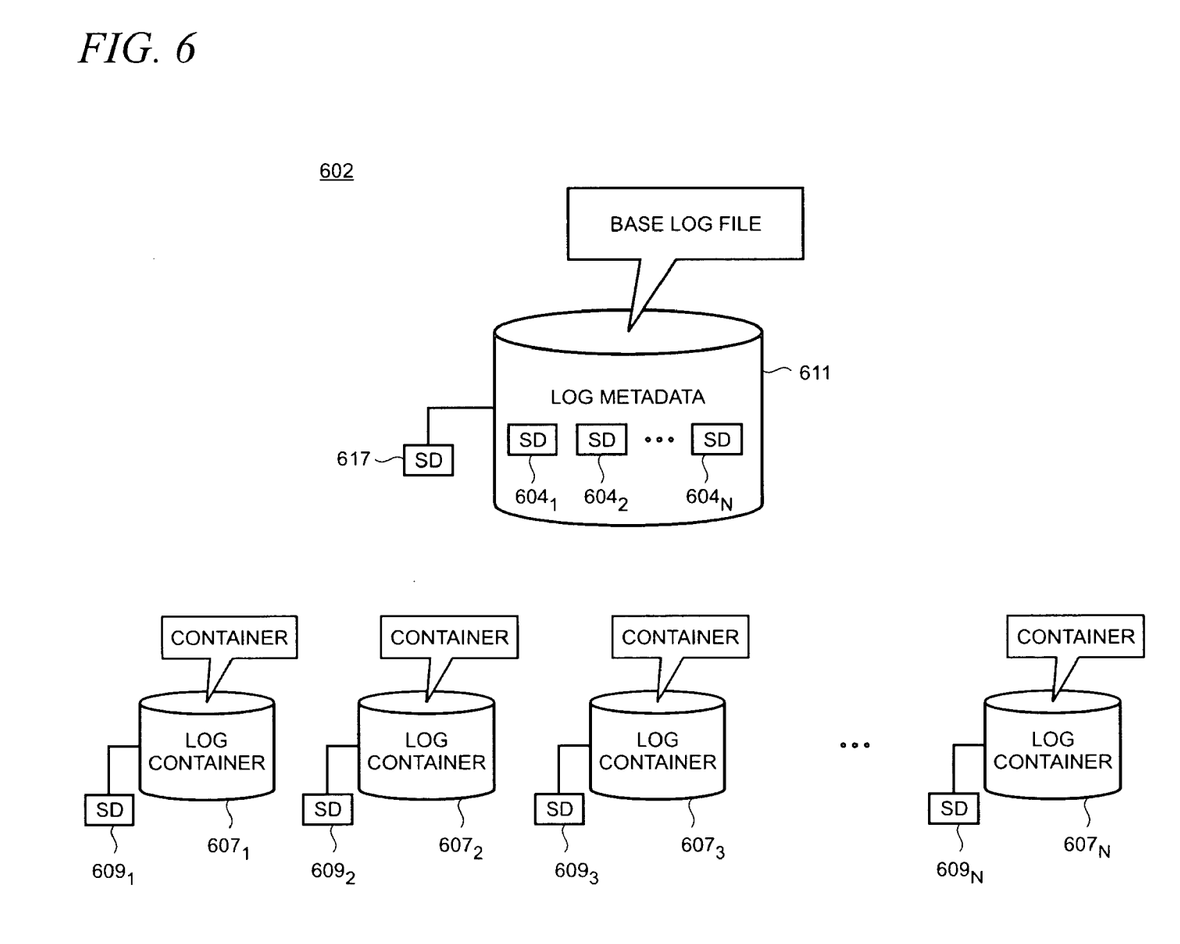
FIG. 6 is a simplified block diagram showing an illustrative secure storage configuration.

FIG. 6 is a simplified block diagram showing an illustrative secure storage configuration 602. As noted above, the present security model utilizes an arrangement in which log clients are agnostic of whether a log handle belongs to a real log file stream or a virtual log file stream. Accordingly, each log file, real or virtual in this illustrative example, must have its own security descriptor. Security descriptors 604 for each real or virtual log are treated as part of the log file metadata and indicated by "SD" in FIG. 6. The security descriptor authorizes user access to the log file and guarantees integrity of the log file by ensuring that the metadata file, and all containers, belong together as logical group to thereby form the physical log. Accordingly, the security descriptor must be the same for the metadata file and each of the containers. In an alternative arrangement, a cryptographically-secure signature may by used to supplement or replace the security descriptor to provide a enhanced level of security, by using a shared private key, which may be desirable in some applications of the present security model.

Because containers belong to the underlying file system, their security descriptors are stored as persistent attribute data in the file system and are therefore maintained by the underlying file system. As shown, a plurality of containers 607-1, 2 . . . N are used to store a physical log associated with one or more real or virtual log streams. Each container has its own security descriptor 609-1, 2 . . . N which is maintained by the underlying file system.

In addition to log file security descriptors, log file metadata includes configuration data on both real and virtual log files. Part of the configuration of a real log file comprises unique container identifiers, container location, and the relationship among containers in a container queue. All metadata on a log file is stored in a file called the base log file 611 ("BLF"). The security descriptor 617 for the BLF 611 is maintained by the underlying file system. Thus, the security descriptors 604 internal to BLF 611 are associated with log files, while the external security descriptors, i.e., security descriptors 609 and 617, are associated with containers.

When a log client creates a real log file for the first time, it creates a BLF 611 based on the path specified by the physical log part of the log file name. The BLF 611 is created under the context of a CLFS-principal or the local system-principal on behalf of the log client. These principals are the owners of the BLF 611. The log client principal is not set as an owner of the BLF 611, but will be granted permission to read or delete the BLF 611.

Members of the administrative group will have administrative access to change discretionary access control on the BLF 611 but no immediate permissions to read, write, or delete the BLF 611. Creation of the BLF 611 is atomic and the security descriptor for the BLF 611 is maintained by the underlying file system.

As part of any log file creation, real or virtual, the CLFS driver 212 (FIG. 2) creates a security descriptor for the log file giving the log client principal full access to the log and stores the security descriptor as part of the metadata file within the context of the CLFS-principal or a local system-principal. BLF 611 and containers 607, in the present security model paradigm, are owned by the user that initiates their creation. In this way, quota restrictions may be enforced to log file creation and log container creation. It also implies that log files may be owned by a user that is different from the owner of the BLF 611.

The security descriptor for the log file is maintained solely by the CLFS driver 212, but stored as file system data in the BLF 611. The log client can use the administrative calls to read and change the security descriptor and therefore has complete discretionary control over who accesses the log file with the exceptions outlined in Assertion (B) above.

Before a log client reads or writes to the log file, it must first add containers 607 to back the data read from or written to the log. The log client must have opened a handle or log file object with write permission to the log to add or delete a container. As noted above, containers are created with the same security descriptor as the BLF file. Therefore, a log client owning the log file is enabled to directly read or delete a container at any time by working through the file system. The CLFS driver 212 must guarantee that the security descriptor on the BLF 611 is identical to the security descriptor on all containers 607 at all times. This requires that any change in ownership of the physical log file be propagated to the security descriptor on the BLF 611 and all other containers 607 atomically, as described below. In alternative arrangements where a cryptographically-secure signature is utilized, protection against unauthorized access (i.e., "spoofing") to the BLF 611 and/or containers 607 is further enhanced.

On opening a log file, a log client implicitly supplies its principal's security token and explicitly requests the type of access permission on the log file. If the log file is not otherwise opened, it must first open the BLF 611 of the underlying physical log in containers 607 and validate its security descriptor and those of each of the containers 607. Once the authenticity of the BLF 611 and the containers 607 is determined, the CLFS driver 212 opens all containers 607 associated with the physical log file to check the log security token and the access type of the request against the stored security descriptor for the log file. Only after all these tests are successful is the log client given a handle, or file object, to the log file. If the log file is otherwise opened, validation of the security descriptor is bypassed, but the security token of the log client and its access types are still tested against the security descriptor of the log file. In alternative arrangements utilizing a cryptographically-secure signature, the cryptographically-secure signature is validated in addition to the security descriptor for the BLF 611 and containers 607 before a log client is provided with a handle or file object to the log file.

Once a log file is open, the access type of each operation on the log is tested against open attributes of the log file objects. This check determines whether or not the operation is allowed on the handle and complements authorization at the handle, or file object, creation time. Both types of tests must succeed for any operation on the log file to complete successfully.

The present protected subsystem operates by delegating all operations on a log file to the CLFS-principal or the local system-principal. These principals are the only ones given the responsibility to write containers and update their discretionary access control in the underlying file system.

The present security model maintains that the security descriptor of each container is identical to that of the BLF 611 to thereby provide a mechanism for validating the integrity of the BLF 611 and any container it references. Also, as noted above, owners of the physical log are allowed to read and delete log containers. This facilitates debugging and recovery of log files as an owner as opposed to a system principal. It thus follows that any change in ownership of the physical log must be propagated to the security descriptor of the BLF 611 and all log containers. Any inconsistency between security descriptors would be evidence that a potentially pathological log client has attempted to corrupt a log. However, it is emphasized that log files may be owned by a user that is different from the owner of the BLF 611 as required to preserve quota protections.

Consider two log clients $U_1$ and $U_2$ on a log L owned by $U_1$. Suppose $U_1$ changes security on the log to give $U_2$ ownership rights on L. Also, presume that with its new authority $U_2$ proceeds to deny $U_1$ all access to the log. If the update to security is not atomic, then these operations may result in race conditions that lead to paradoxical and non-deterministic semantics. Furthermore, atomicity must be guaranteed across system crashes. The following algorithms check the consistency of security descriptors among the BLF 611 and its containers 607 and guarantee their atomicity is persistent across system crashes.

The following illustrative algorithms assume a log file, L, with a BLF, $C_0$, and n containers $C_1, C_2, \ldots C_n$ and utilization of a cryptographically-secure signature. Such cryptographically-secure signature is arranged to protect the containers as well as the metadata in the BLF that, if misused, could enable corruption of the log or enable the user to attack the other data sources. In an alternative arrangements where a security descriptor is utilized, such security descriptor may also be atomically propagated as described herein.

The containers are laid out in the container queue as a permutation $C_{\sigma(1)}, C_{\sigma(2)}, \ldots C_{\sigma(n)}$ of $C_1, C_2, \ldots C_n$ such that $C_{\sigma(i)}$ precedes $C_{\sigma(j)}$ if $\sigma(i) < \sigma(j)$. The original cryptographically-secure signature on container, $C_i$, is $S_i$ and its new cryptographically-secure signature $S_i'$. For any valid log file L, initially $S_0 = S_1 = S_2 = \ldots = S_n$ and the cryptographically-secure signatures on the log file are said to be valid.

A validation algorithm 1 below verifies this equality invariant on the container cryptographically-secure signature:

---

1. Start
2. Read $S_0$, return if Error.
3. For $0 < i \leq n$
    Read $S_{\sigma(i)}$, return if Error.
    If $S_{\sigma(i)} \neq S_0$ and STATE = update in progress
        For $i \leq j \leq n$
            Set $S_{\sigma(i)} = S_0$, return if Error.
        EndFor
        Else return with Error
    EndIf
4. EndFor
5. Reset STATE.
6. Return with Success.
7. End

---

Algorithm 1 first reads the cryptographically-secure signature for the BLF 611 then compares it against the cryptographically-secure signature for each container 607 in order of the container queue. If all the containers 607 have the same cryptographically-secure signature, then the validation passes. However, if there exists some container, say $C_{\sigma(j)}$, with a cryptographically-secure signature $S_{\sigma(j)}$ that differs from $S_0$ (the cryptographically-secure signature contained in the BLF 611), which could occur as a result of a failed or interrupted update, then the cryptographically-secure signatures of all containers from $C_{\sigma(j)}$ onward in the container queue are updated to $S_0$. This could occur, for example, if there was an update in progress of cryptographically-secure signatures that was incomplete. Note that on any error, the validation fails with an appropriate error code, for example, that the log file is corrupt.

An update algorithm 2 below guarantees that if $S_0$ attempts to change to $S_0'$ during some interval between time t and t', where t'>t, either (a) $S_0'=S_1'=S_2'=\ldots=S_n'\neq S_0$, the cryptographically-secure signature was updated, or (b) $S_0'=S_1'=S_2'=\ldots=S_n'=S_0$, the cryptographically-secure signature was not updated at time t'.

---

1. Start
2. Validate $S_{\sigma(i)}$, $0 < i \leq n$ using Algorithm 1
3. Set $S_0'$ and set STATE = update in progress
4. For $0 < i \leq n$
    Set $S_{\sigma(i)}' = S_0'$
    If Error
        Validate $S_{\sigma(i)}$, $0 < i \leq n$ using Algorithm 1
        If NewError, return with NewError.
        Else return with Error.
    EndIf
5. EndFor
6. Set $S_0 = S_0'$
7. If Error
    Validate $S_{\sigma(i)}$, $0 < i \leq n$ using Algorithm 1
    If NewError, return with NewError.
    Else return with Error.
8. EndIf
9. RESET STATE
10. Return with Success.
11. End

---

Step 2 of algorithm 2 ensures that the equality invariant on container cryptographically-secure signatures holds for the current BLF. On successful completion of Step 2, the algorithm binds the new value of the cryptographically-secure signature in Step 3. Step 4 updates the cryptographically-secure signatures of all containers in the container queue and guarantees atomicity of the operation on failure by rolling back to the old value of the cryptographically-secure signature. Lastly, Step 6 updates the cryptographically-secure signature of the BLF itself, again guaranteeing atomicity by rolling back to the old value of the cryptographically-secure signature on failure. A simple proof of the algorithm will show that the equality invariant holds with the cryptographically-secure signature of the BLF set to $S_0$ or $S_0'$ dependent on whether the algorithm ends in error, or ends successfully.

Recall Assertion (C) above. This assertion establishes that owners of a real, or physical, log initially have the authority to read and delete containers but no authority to write to them. To write to a container, the log owner must either be the CLFS- or the local system-principal or explicitly be given permission to do so by the protected subsystem 505 (FIG. 5). Also, the protected subsystem 505 always checks that the BLF 611 and its containers 607 are primarily owned by the CLFS- or local system-principal, otherwise, it invalidates the log as one containing a corrupted BLF or container. Typically, therefore, owners of a log file are able to read container data, but are unable to write to containers or to the BLF 611 during a log file copy or migration process.

Log migration therefore introduces a new requirement on the user-mode log API set to include log export and import functionality. Exporting a log enables the protected subsystem 505 to serialize all relevant BLF and container data consistently to a single file on behalf of a log file owner. Conversely, export is a mechanism that allows log file owners to create a log and import its metadata and data from a serialized exported log file.

Log migration from a non-secure file system to a secure file system does not present an opportunity for the underlying file system or operating system to be compromised. On a non-secure file system, log security descriptors are potentially exposed to unauthorized updates in the metadata file. However, this can only compromise the security of the logs themselves because the present security model cleanly separates log file security from container security. Container security is maintained by the underlying file system and modification is extremely restrictive: only the CLFS- and local system-principal have write or write control access to containers. All other principals on the system have, at most, read and delete access to the container. Therefore, there is no means for a malicious user to transitively leverage permissions on the log security descriptors to gain unauthorized access to the file system or other secure operating system objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for facilitating security for one or more log files in a multiplexed physical log that is commonly shared among log clients and implemented using stable storage, the method comprising the steps of:

establishing a protected subsystem in which file system operations are exclusively delegated to a machine-wide principal that accesses container files in an underlying secure file system used to back the commonly shared multiplexed physical log so that operations on the container files are segregated from operations on the one or more log files, a cryptographically-secure signature being associated with each of the one or more log files and each of the container files, the cryptographically-secure signature being arranged to protect log file metadata, the log file metadata including a container list;

implementing a set of rules applicable to the container files in the secure file system, the rules including
    a first rule specifying that the container files are created, opened and owned by the machine-wide principal that is provided with exclusive read/write and control access to the container files,
    a second rule specifying that a principal in an administrative group owns the container files but has no permission to delete the container files, or access data within the container files,
    a third rule specifying that a principal that owns a real log file has permission to read and delete container files underlying the real log file;

providing, to log clients, a user-mode interface and a kernel-mode interface to the protected subsystem, the interfaces being arranged for enabling the log clients to make I/O requests in one or more virtual log streams to the one or more log files in the commonly shared multiplexed physical log through the principal;

reserving an individual marshalling area for each of the virtual log streams, each of the individual marshalling areas having a unique address space in volatile memory and being configured to buffer log records written by a log client to a virtual log stream prior to being flushed to the commonly shared multiplexed physical log and to buffer log records read by a log client from the virtual log stream, the protected subsystem including a common log file system (CLFS) driver intercepting the I/O requests from the log clients to the underlying secure file system, the CLFS driver having associated therewith user-mode application programming interfaces (APIs) and kernel-mode APIs that provide the marshalling areas to the log clients;

maintaining security semantics on a per-virtual log stream basis so that each virtual log stream is abstracted to a respective log client to appear as being stored in a dedicated log; and consolidating the I/O requests in the virtual log streams through the interface to the commonly shared multiplexed physical log in the underlying secure file system.

2. The method of claim 1 in which the principal is one of machine-wide principal, common log file system-principal, system-principal or security-principal.

3. The method of claim 1 in which the interface includes one of kernel-mode interface or user-mode interface.

4. The method of claim 1 in which a security descriptor is associated with each of the one or more log files and each of the container files.

5. The method of claim 4 in which the security descriptor associated with each of the one or more log files is stored in a base log file and including a further step of validating log file integrity by confirming that the stored security descriptor is identical to the security descriptor associated with each of the container files.

6. The method of claim 1 in which the cryptographically-secure signature associated with each of the one or more log files is stored in a base log file.

7. The method of claim 6 including a further step of validating log file integrity by confirming that the cryptographically-secure signature stored in the base log file is identical to the cryptographically-secure signature associated with each of the container files.

8. The method of claim 6 including a further step of atomically updating a cryptographically-secure signature for each of the container files.

9. The method of claim 8 including a further step of rolling back the cryptographically-secure signature to an original value in each of the container files upon occurrence of a failure.

10. The method of claim 1 including a further step of providing a user-mode API set to enable log file import and export functionality.

11. The computer-implemented method of claim 1 in which the rules further comprise a fifth rule specifying that the container files may be backed up or restored by a principal having backup or restoration privileges.

* * * * *